(12) United States Patent
Nakazono et al.

(10) Patent No.: US 6,765,326 B1
(45) Date of Patent: Jul. 20, 2004

(54) COOLING DEVICE MOTOR HAVING A HYDRODYNAMIC BEARING WITH A UNITARY SHAFT THRUST SUPPORTER

(75) Inventors: Eiichiro Nakazono, Usa (JP); Akitomo Yamashita, Usa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 634 days.

(21) Appl. No.: 09/258,320

(22) Filed: Feb. 26, 1999

(30) Foreign Application Priority Data

Feb. 27, 1998 (JP) .......................................... 10-046970

(51) Int. Cl.⁷ ............................. H02K 7/08; F16G 17/02
(52) U.S. Cl. ........................ 310/90; 384/112; 384/115
(58) Field of Search ............................. 310/90, 62, 64, 310/67 R, 89; 384/276, 112, 115; 361/695, 697

(56) References Cited

U.S. PATENT DOCUMENTS

| | | | |
|---|---|---|---|
| 5,357,163 A | * 10/1994 | Minakuchi et al. | 310/90 |
| 5,610,462 A | * 3/1997 | Takahashi | 310/90 |
| 5,638,895 A | * 6/1997 | Dodson | 165/121 |
| 5,715,116 A | * 2/1998 | Moritan et al. | 360/99.08 |
| 5,940,267 A | * 8/1999 | Katsui et al. | 361/697 |
| 5,940,268 A | * 8/1999 | Miyahara et al. | 361/697 |
| 6,084,328 A | * 7/2000 | Yamashita et al. | 310/90 |

FOREIGN PATENT DOCUMENTS

| | | | |
|---|---|---|---|
| JP | 63-58283 | 11/1988 | |
| JP | 5-141411 | * 6/1993 | .................. 310/90 |
| JP | 6-178497 | * 6/1994 | .................. 310/90 |
| JP | 7-1528 | 1/1995 | |
| JP | 7-042749 | * 2/1995 | .................. 310/90 |
| JP | 9-037516 | * 2/1997 | .................. 310/90 |
| JP | 11-082478 | * 2/1999 | .................. 310/90 |

* cited by examiner

*Primary Examiner*—Karl Tamai
(74) *Attorney, Agent, or Firm*—Wenderoth, Lind & Ponack, L.L.P.

(57) ABSTRACT

A motor and a cooling device include (a) a frame with an opening, (b) a frame-housing provided on the frame and having one open side, (c) a stator mounted on an outer wall of the frame-housing, (d) a sleeve fit into the frame-housing, (e) a thrust supporter formed unitarily with a bottom face of the frame-housing, (f) a shaft having an end supported by the thrust supporter, inserted into the sleeve and rotatably supported, (g) a rotor to which the shaft is mounted, (h) a magnet mounted on the rotor and being opposite to the stator, and (i) oil provided in a space between the shaft and the sleeve. This construction saves a fitted section of the frame and the thrust supporter, and improves the flatness of the bottom face of frame. As a result, oil-spill due to temperature change cycles can be avoided, and adherence between a heating element and the cooling device is improved, so that heat conductivity and cooling efficiency are increased.

1 Claim, 8 Drawing Sheets

COOLING DEVICE MOTOR HAVING A HYDRODYNAMIC BEARING WITH A UNITARY SHAFT THRUST SUPPORTER

FIELD OF THE INVENTION

The present invention generally relates to a motor having a hydrodynamic bearing, and more particularly to a cooling device using the motor for efficiently cooling e.g. semiconductor devices.

BACKGROUND OF THE INVENTION

Figure 7:
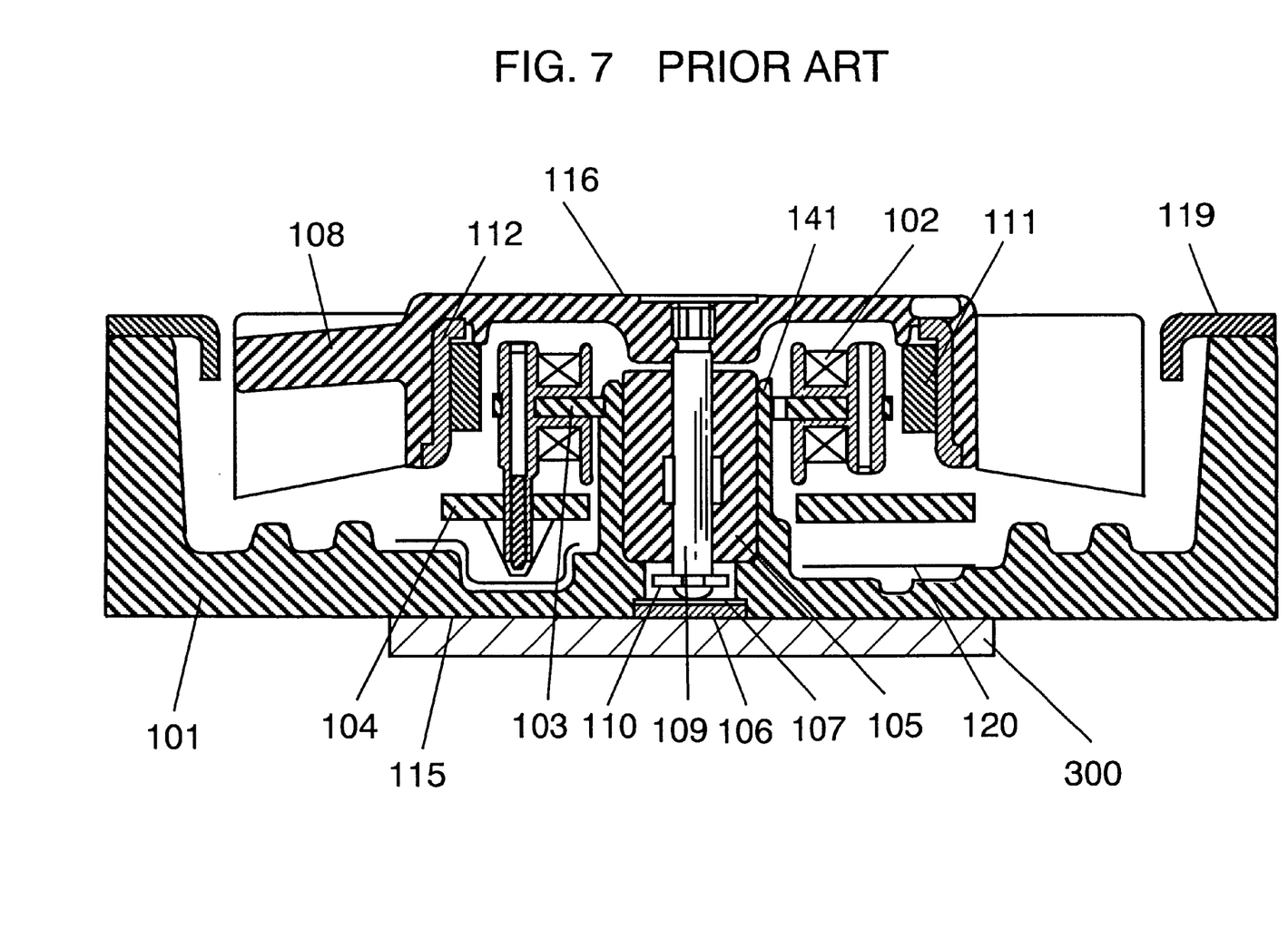
FIG. 7 is a cross section depicting a conventional cooling device for semiconductor devices.
Figure 8:
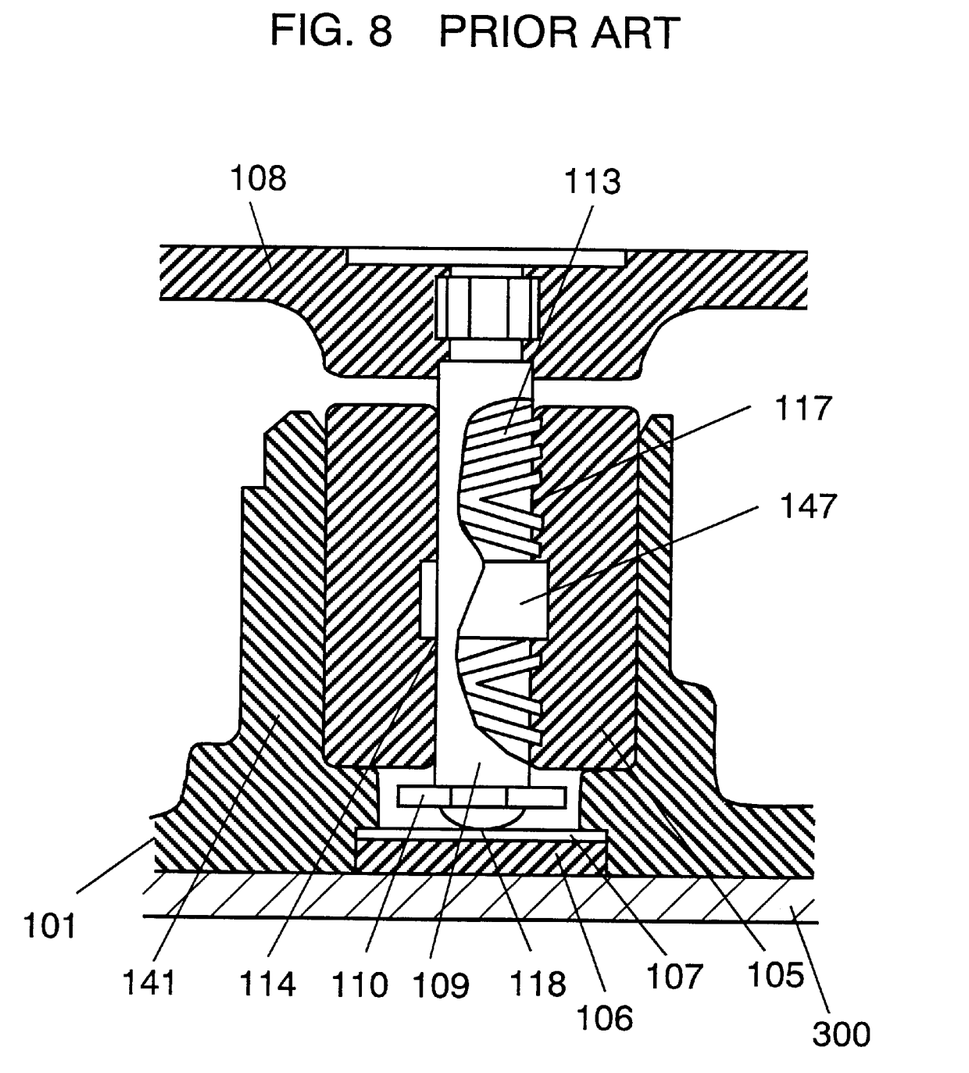
FIG. 8 is a cross section of a bearing of a motor employed in the conventional cooling device.

FIG. 7 is a cross section depicting a structure of a conventional cooling device employing a motor having a hydrodynamic bearing. FIG. 8 is a cross section of a motor-bearing employed in the cooling device of FIG. 7.

A structure of the prior art is described hereinafter with reference to FIG. 7 and FIG. 8.

Housing 141 having one open side and a cup-shape is protrusively formed on a recess of frame 101. Housing 141 secures stator 103 on its outer wall, and stator 103 is wound with coil 102. Driving circuit substrate 104 is disposed around housing 141. Substrate 104 holds stator 103 and connects electrically a terminal of coil 102 to a wiring formed on substrate 104 by soldering. Substrate 104 is equipped with electronic components constituting the driving circuit and Hall elements. Insulating sheet 120 is disposed between substrate 104 and frame 101.

Frame 101 is surrounded by a side wall and has an upward opening. Bell-mouth 119 is disposed around the opening to promote airflow. Housing 141 fixedly secures thrust plate 106 and thrust sheet 107 on its bottom face. Sleeve 105 is fit into housing 141. Stator unit 115 comprises these elements discussed above, i.e. frame 101, housing 141, sleeve 105, coil 102 and stator 103.

Rotary shaft 109 extends through sleeve 105 and is axially supported by thrust plate 106 as well as rotatably supported by sleeve 105. Fan 108 is mounted to shaft 109. Washer 110 fixed on shaft 109 prevents fan 108 from coming off from sleeve 105. Magnet 111 is bonded to fan 108 via magnet yoke 112 so that magnet 111 faces stator 103. Rotor 116 comprises the elements discussed above, i.e. magnet 111, yoke 112 and fan 108.

The bearing of the motor is detailed hereinafter with reference to FIG. 8.

In FIG. 8, sleeve 105 is equipped with oil reservoir 147 in the center portion of its inner wall. Oil reservoir 147 has a greater inner diameter than other parts of the inner wall of sleeve 105. Sleeve 105 has dynamic-pressure-generating grooves 113. Grooves 113 are formed by a ball-rolling-process. Oil 114 is provided to grooves 113 as lubricant for sleeve 105 and shaft 109. Radial bearing 117 is thus formed as discussed above.

The tip of shaft 109 facing thrust plate 106 is finished into a spherical face that contacts thrust sheet 107 so that thrust plate 106 and thrust sheet 107 support shaft 109 axially. Thrust bearing 118 is thus structured as discussed above.

The conventional motor employing this hydrodynamic bearing, however, has the following problems.

In recent years, electronics apparatuses have been obliged to generate a greater amount of heat in order to satisfy market demands such as higher performance as well as down sizing. This situation forces the cooling devices and the cooling-fan-motors of those apparatuses to encounter greater changes in temperatures, and requires them to increase their cooling performance.

In the conventional motor, first, stopper washer 110 is mounted to shaft 109 in order to prevent fan 108 from coming off from the bearing, then thrust sheet 107 and thrust plate 106 are fixedly press-fitted into frame 101. Therefore, temperature change cycles produce a gap between thrust plate 106 and frame 101, and thus oil 114 spills from the gap.

Since thrust plate 106 is independent of frame 101, the flatness of the bottom face of frame 101 is difficult to improve, which reduces adherence between this cooling device and a heating element 300. Further, the center portion, which produces a greater amount of heat than other portions of the heating element, or a device attached to this heating device, can not be substantially cooled down.

The cooling device requires a higher rotational speed in order to increase the cooling performance, which also increases centrifugal forces produced by shaft 109 and fan 108. Oil 114 in the bearing thus flows out along shaft 109 and fan 108, which entails the outflow of oil 114 from dynamic-pressure-generating groove 113. This out-flow causes an oil shortage, which lowers the number of rotations and produces locking of rotor 116.

Further, the downsizing of motors narrows the space for the bearing, miniaturizes the components, and increases the number of components of motors. Thus fabrication of the motor requires more complicated work.

SUMMARY OF THE INVENTION

The present invention addresses the problems discussed above, and aims to provide a motor free from oil-spill from its bearing due to temperature change cycles or motor rotation, and also provides a cooling device using the motor for achieving efficient cooling.

The motor of the present invention comprises the following elements:

(a) a frame having an opening;

(b) a frame-housing provided on the unitary frame and having one side thereof open;

(c) a stator secured on an outer wall of the frame-housing;

(d) a sleeve fit into the frame-housing;

(e) a thrust supporter provided on a unitary bottom face of the frame housing;

(f) a shaft supported by the thrust supporter at the end thereof, inserted into the sleeve, and rotatably supported by the sleeve;

(g) a rotor securing the shaft;

(h) a magnet disposed on the rotor and opposite to the stator; and (i) oil provided in the space between the shaft and sleeve.

The construction discussed above saves the fitted section of the frame and thrust supporter, because the thrust supporter is unitarily formed with the bottom face of the frame housing. The oil-spill due to the temperature change cycles can thus be avoided, and as a result, the reliability and life-span of the motor can be increased.

The unitary forming of the thrust supporter with the bottom face of the frame-housing can improve the flatness of the bottom face, whereby the adherence between the bottom face and the heating element is improved. The heat conductivity from the heating element to the frame can thus be improved. As a result, the cooling performance of the cooling device can be boosted.

In another motor of the present invention, a rib is formed on the rotor rim within which the shaft is mounted, thereby blocking the oil splashed from the space between the shaft and sleeve. As a result, the oil can be prevented from flowing out from the bearing when the motor is in operation.

The cooling device of the present invention comprises the following elements:

(a) a frame having a first opening on a first face surrounded by a side wall and being mountable with a heating element on a second face;

(b) a frame-housing formed on the frame and having one side thereof open;

(c) a stator secured on an outer wall of the housing;

(d) a sleeve fit into the frame-housing;

(e) a thrust supporter unitarily formed with a bottom face of the frame-housing;

(f) a shaft supported by the thrust supporter at the end of the shaft, inserted into the sleeve, and rotatably supported by the sleeve;

(g) a rotor securing the shaft;

(h) a magnet disposed on the rotor and opposite to the stator;

(i) oil provided in the space between the shaft and sleeve;

(j) second openings provided on the side wall of the frame; and (k) a fan provided on the rotor.

The construction discussed above saves the fitted section of the frame and thrust supporter, because the thrust supporter is unitarily formed with the bottom face of the frame housing. The oil-spill due to the temperature change cycles can thus be avoided, and as a result, the reliability and life-span of the motor can be increased.

The unitary formation of thrust supporter with the bottom face of frame-housing can improve the flatness of the bottom face, whereby the adherence between the bottom face and the heating element is improved. The heat conductivity from the heating element to the frame can thus be improved. As a result, the cooling performance of the cooling device can be boosted.

The cooling device draws air from the first opening by rotating the fan, and discharges the air through the second openings. The airflow produced by the draw and discharge operations travels on the frame so that the heat within the frame can be efficiently dissipated. The locations, sizes, and numbers of the second openings can be adaptively determined so that the airflow discharged from the second openings can be blown on the other heating elements or can discharge heated air in a smooth manner. As a result, a cooling device of high performance can be achieved.

DESCRIPTION OF THE PREFERRED EMBODIMENTS

Exemplary embodiments of the present invention are described hereinafter with reference to the accompanying drawings.

Exemplary Embodiment 1

Figure 1:
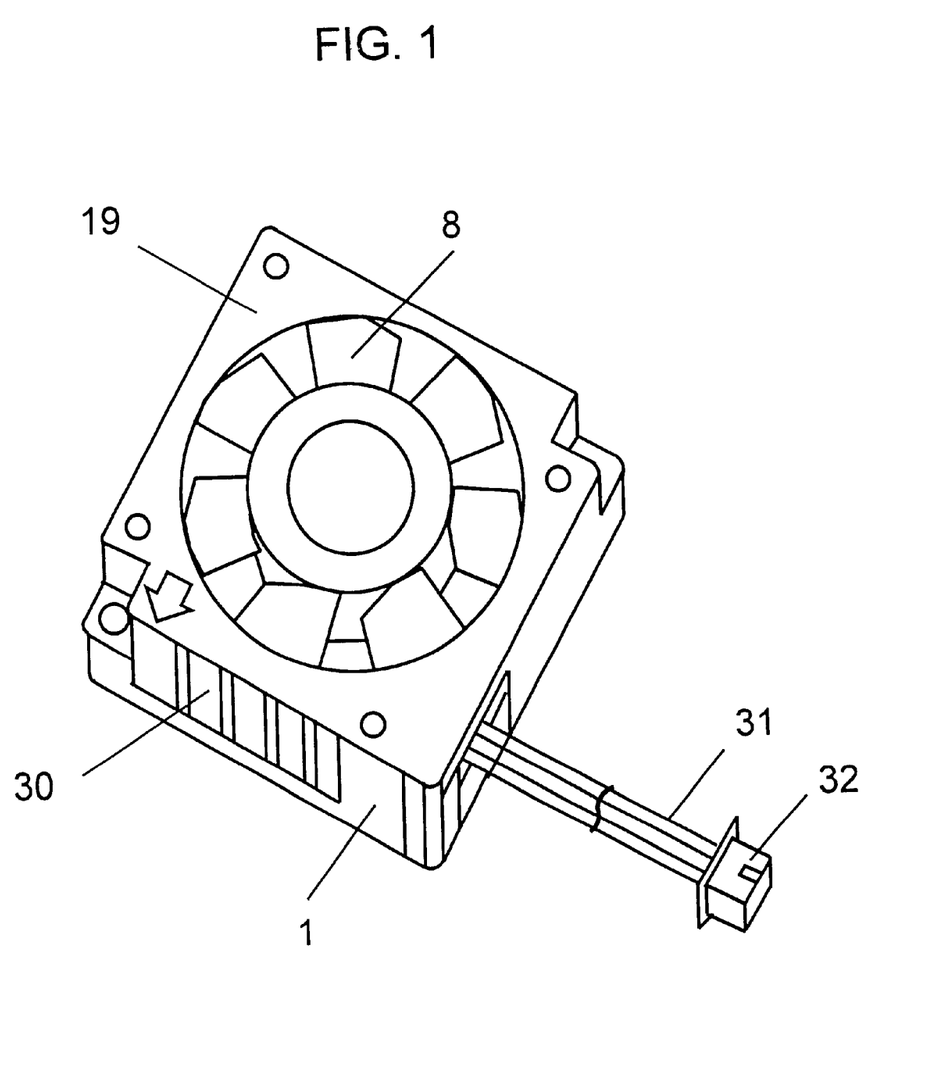
FIG. 1 is a perspective view of a cooling device in accordance with a first exemplary embodiment of the present invention.

FIG. 1 is a perspective view of a cooling device in accordance with the first exemplary embodiment of the present invention.

In FIG. 1, the cooling device has a semiconductor device 300 (seen in FIG. 2), e.g. a CPU, underneath the bottom face of metal frame 1. The heat generated by the semiconductor device travels to the frame 1. The cooling device draws air from the top opening by rotating fan 8, and discharges the air through opening 30 provided on a side wall of frame 1. Airflow produced by the draw and discharge operations travels on the inner face of frame 1 and goes out from opening 30 of the side wall so that the heat within frame 1 can be efficiently dissipated. Bell-mouth 19 mounted around the top opening promotes the airflow. A first terminal of lead-wire 31 is coupled to a driving-circuit-substrate disposed in frame 1 through a hole or a notch provided on the side wall of frame 1. A second terminal of lead-wire 31 is connected to connector 32 that is coupled to a power supply (not shown) and a controller (not shown). The power supply drives this cooling device, and the controller exchanges control information between the controller and cooling device.

Figure 2:
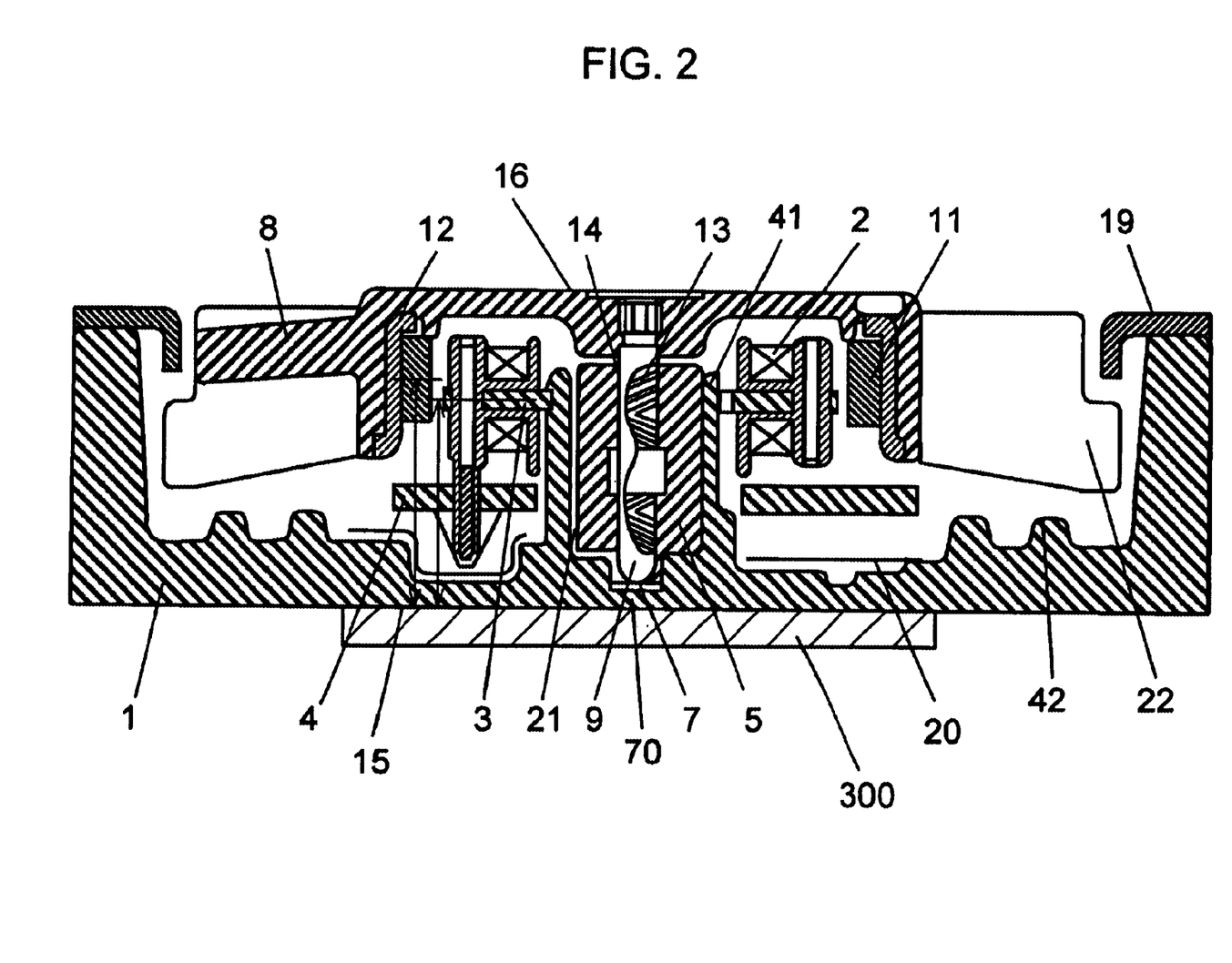
FIG. 2 is a cross section of the cooling device in accordance with the first exemplary embodiment of the present invention.
Figure 3:
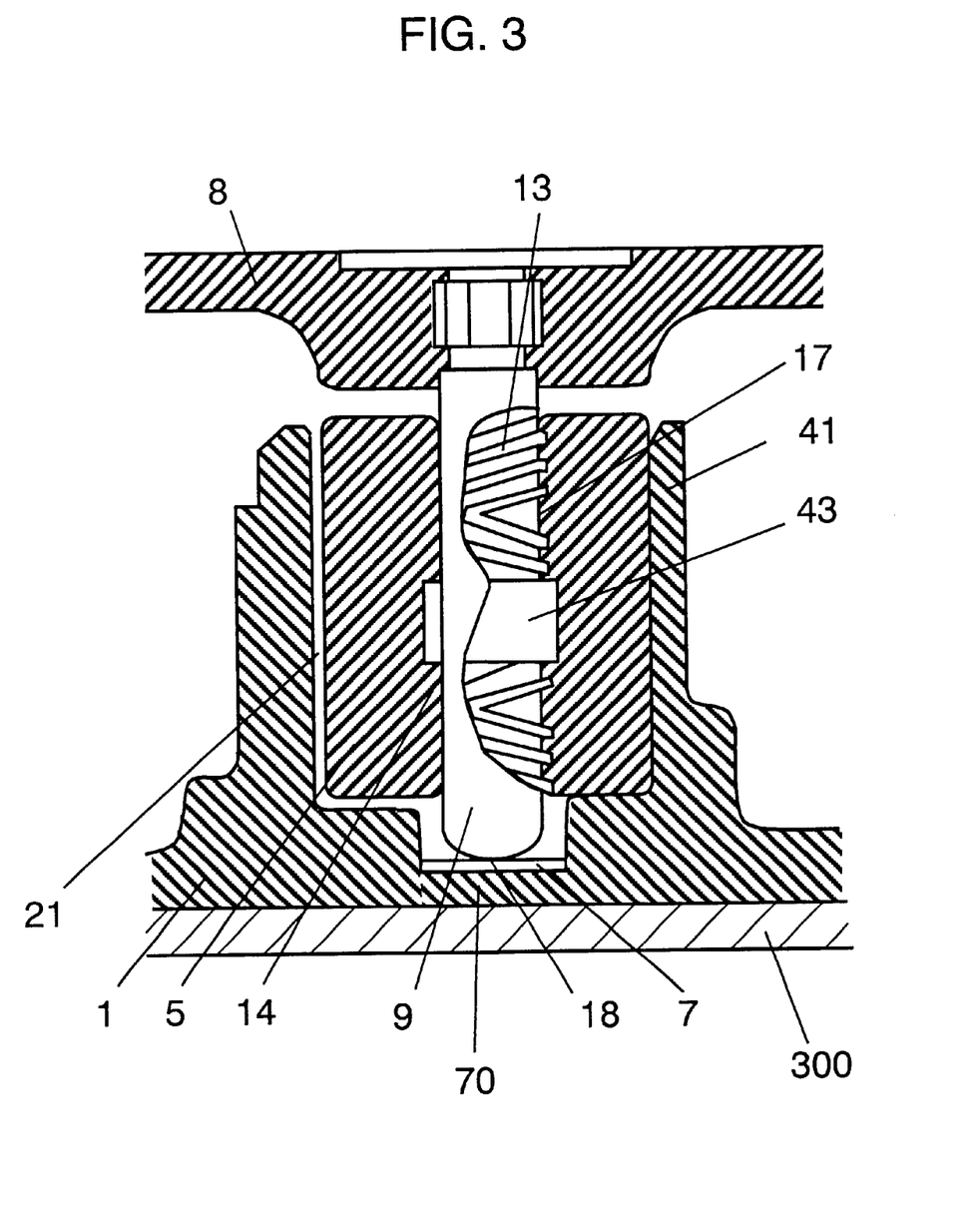
FIG. 3 is a cross section depicting a bearing of a motor employed in the cooling device in accordance with the first exemplary embodiment of the present invention.

FIG. 2 is a cross section of the cooling device in accordance with the first exemplary embodiment of the present invention. FIG. 3 is a cross section depicting a bearing of a motor employed in the cooling device in FIG. 2.

Frame-housing 41 having one open side and cup-shaped is protrusively formed on a recess of frame 1. Frame-housing 41 has stator 3 secured on its outer wall, and stator 3 is wound with coil 2. Driving-circuit-substrate 4 is disposed around frame-housing 41. Substrate 4 holds stator 3 and connects electrically a terminal of coil 2 to a wiring formed on substrate 4 by soldering. Substrate 4 is equipped with electronic components constituting the driving circuit and Hall elements detecting a rotational position of rotor 16. Insulating sheet 20 is disposed between substrate 4 and frame 1. Fins 42, shaped as a plate, an arc or a pin, are disposed in a recess of frame 1.

Frame 1 has a side wall and an upward opening. Bell-mouth 19 is disposed around the opening, namely on the side wall, to promote airflow. Frame 1 is equipped with a given number of openings (marked with numeral 30 in FIG. 1) having a given size on the side wall, and these openings conduct air in a given direction. The bottom face of frame 1 has a flat region underneath which a heating element 300, e.g. a semiconductor device, can be mounted. Frame 1 and fins 42 are made of a metal material of high thermal conductivity such as aluminum, brass or copper so that thermal conductivity from the heating elements to the frame and fins can be increased, and the heat-dissipation-efficiency can be improved.

Rotor 16 secures fan 8, and step section 22 is formed on the outer edge of fan 8. Bell mouth 19 covers step section 22 to prevent fan 8 from coming off.

The bottom of cup-shaped frame-housing 41 is recessed so that a step is provided. Thrust sheet 7 made of resin is disposed at the bottom of the recessed section. Sleeve 5 is press-fitted into housing 41 until it is situated on the upper step. Ventilating groove 21 is provided on the inner wall of frame-housing 41 extending from top to bottom. The step provided in frame-housing 41 can pool oil in the recessed section.

Stator unit 15 is structured as discussed above and comprises frame 1, frame-housing 41, sleeve 5, coil 2 and stator 3.

Rotary shaft 9 measures 1.5 mm across, extends through sleeve 5, is supported axially by thrust supporter 70 via thrust sheet 7, and is rotatably supported by sleeve 5. Shaft 9 is provided integrally with fan 8. Magnet 11 is bonded to fan 8 via magnet yoke 12 so that magnet 11 faces annular stator 3. Magnet 11 is placed at a greater distance than stator 3 from the bottom face of frame-housing 41. In other words, the center of magnet 11 in the thrust direction is deviated from that of stator 3 by a short distance, i.e. the stator center is placed at a nearer location than the magnet center to the bottom face of frame-housing 41. This arrangement allows stator 3 to attract magnet 11 so that the end of shaft 9, the shaft being integrally formed with fan 8, depresses thrust sheet 7 and the bottom face of frame-housing 41, i.e. thrust supporter 70. This pressure (magnetic thrusting force) prevents fan 8 from coming off -from sleeve 5. Rotor 16 is so structured as discussed above and comprises magnet 11, yoke 12 and fan 8.

The bearing of the motor is further detailed hereinafter with reference to FIG. 3.

In FIG. 3, dynamic-pressure-generating-grooves 13 are formed on the inner wall of sleeve 5 by a ball-rolling process. Grooves 13 are herring-bone shaped, and comprise two groups of grooves, i.e. upper and lower groups. Oil 14 is provided in the grooves. Oil reservoir 43 is provided at the middle portion of these two groups. Oil reservoir 43 pools surplus oil for grooves 13. The rotation of shaft 9 moves the oil through grooves 13 to the center portions thereof, thereby producing a pumping force. Shaft 9 is thus centered in the sleeve 5 and rotatably supported by the sleeve.

Dynamic-pressure-generating-grooves 13 are further detailed here.

Grooves 13 undergo a sizing process for removing burrs that have been produced by the ball-rolling-process so that the inner wall surface is finished as flat as having not more than ±2 μm error. The clearance between shaft 9 and sleeve 5 is determined at 2–12 μm for one side each. Oil 14 is provided to grooves 13 as a lubricant for shaft 9 and sleeve 5. Radial bearing 17 is so structured as discussed above, and sleeve 5 journals shaft 9 and allows shaft 9 to rotate arbitrarily. Grooves 13 can be formed on the outer wall of shaft 9 instead of on the inner wall of sleeve 5.

The shaft-end on the opposite side of fan 8 is finished in a spherical shape. The end of shaft 9 contacts thrust sheet 7 and is supported axially by thrust supporter 70. Thrust bearing 18 is thus constructed. Thrust supporter 70 of this exemplary embodiment, namely corresponding to conventional thrust supporter 106 shown in FIG. 8, is unitarily formed with the bottom face of frame-housing 41.

Sleeve 5 is made of copper alloy specified by JIS C3604 or JIS BC6C (JIS=Japanese Industrial Standard) because the efficiencies of cutting and ball-rolling are considered. Shaft 9 is made of stainless steel specified by JIS SUS420J2 or the like because abrasion-resistance and easy-treatment are considered. Oil 14 is a heatproof oil such as fluorine synthetic fluid so as to withstand a high temperature, for the cooling device of the present invention often has semiconductor devices (heating elements) secured directly to the frame and is thus required to resist a high temperature. Extreme-pressure-additive is added to oil 14 so that locally concentrated extreme pressure can be moderated.

Since thrust supporter 70 is unitarily formed with the bottom face of frame-housing 41, the construction of the bearing discussed above saves having a fitted section of frame 1 and thrust supporter 70. As a result, oil-spill due to temperature change cycles can be avoided.

The unitary formation of thrust supporter 70 with the bottom face of frame-housing 41 can improve the flatness of the bottom face, whereby the adherence between the bottom face and the heating element is improved. The heat conductivity from the heating element to the frame can thus be improved, and the heat within the frame-housing can be efficiently dissipated.

Ventilating groove 21 is formed at the fitted portion between frame-housing 41 and sleeve 5. When shaft 9 is inserted into sleeve 5, air within sleeve 5 escapes so that air-pressure of the air between the bottom of frame-housing 41 and sleeve 5, and that of the air on the fan side above sleeve 5, become equal. As a result, shaft 9 can be inserted smoothly into sleeve 5.

The space between frame-housing 41 and sleeve 5, i.e. the depth of groove 21, is set so narrow that oil does not flow out through groove 21 even if the cooling device is placed upside down, namely, fan 8 is placed at the bottom. In this exemplary embodiment, the space is set at not more than 0.3 mm so that surface tension prevents the oil from flowing out. Groove 21 can be formed on at least one of the outer wall of sleeve 5, or the inner wall of the frame-housing 41.

As shown in FIG. 2, magnet 11 is placed at a greater distance than stator 3 from the bottom face of frame-housing 41. This placement allows stator 3 to attract magnet 11 so that a force drawing rotor 16, and thus fan 8, to frame 1 is generated. This force prevents fan 8 from coming off from the bearing due to strong vibrations or shocks. Since this structure preventing shaft 8 from coming off is formed outside the bearing, the construction of the bearing per se is simplified, and the efficiency of assembly work thereof can be improved.

The outer edge of fan 8 is covered by bell mouth 19 attached to the side wall of frame 1. Even if stronger vibrations or shocks than those mentioned above were applied to this cooling device, this structure can positively prevent fan 8 from coming off.

An operation of the cooling device of the present invention is described hereinafter.

When a driving voltage is applied to the cooling device via lead wire 31, the motor spins fan 8. Then, the cooling device draws air axially from the top opening of frame 1. The air travels through a path formed by fins 42 and is discharged from opening 30 provided on the side wall of frame 1. The airflow takes heat from frame 1 and fins 42, to which the heat travels from heating elements, so that the cooling device functions well. The directions of openings 30 on the side wall are adaptively determined responsive to the applications intended by an apparatus employing this cooling device, such as blowing the discharged air to other heating elements or discharging the heated air from the apparatus efficiently.

A shape of fins 42 is not limited to a plate, an arc or a pin, but may be a triangle, wing, coil, circle, or a radial shape as far as the fins work in the same way and produce the same effect. When an outer dimension of the cooling device measures as small as less than 40 mm square, the motor is naturally downsized, which results in a smaller output of the motor. In this case, wind force produced by the fan becomes poor, and fins disposed in the frame block the airflow and thus reduce air capacity to be discharged. The fins therefore produce an adverse effect. In the case of employing such a small cooling device, fins are desirably omitted so that the amount of air capacity to be discharged can be increased to boost the heat dissipation effect.

Exemplary Embodiment 2

Figure 4:
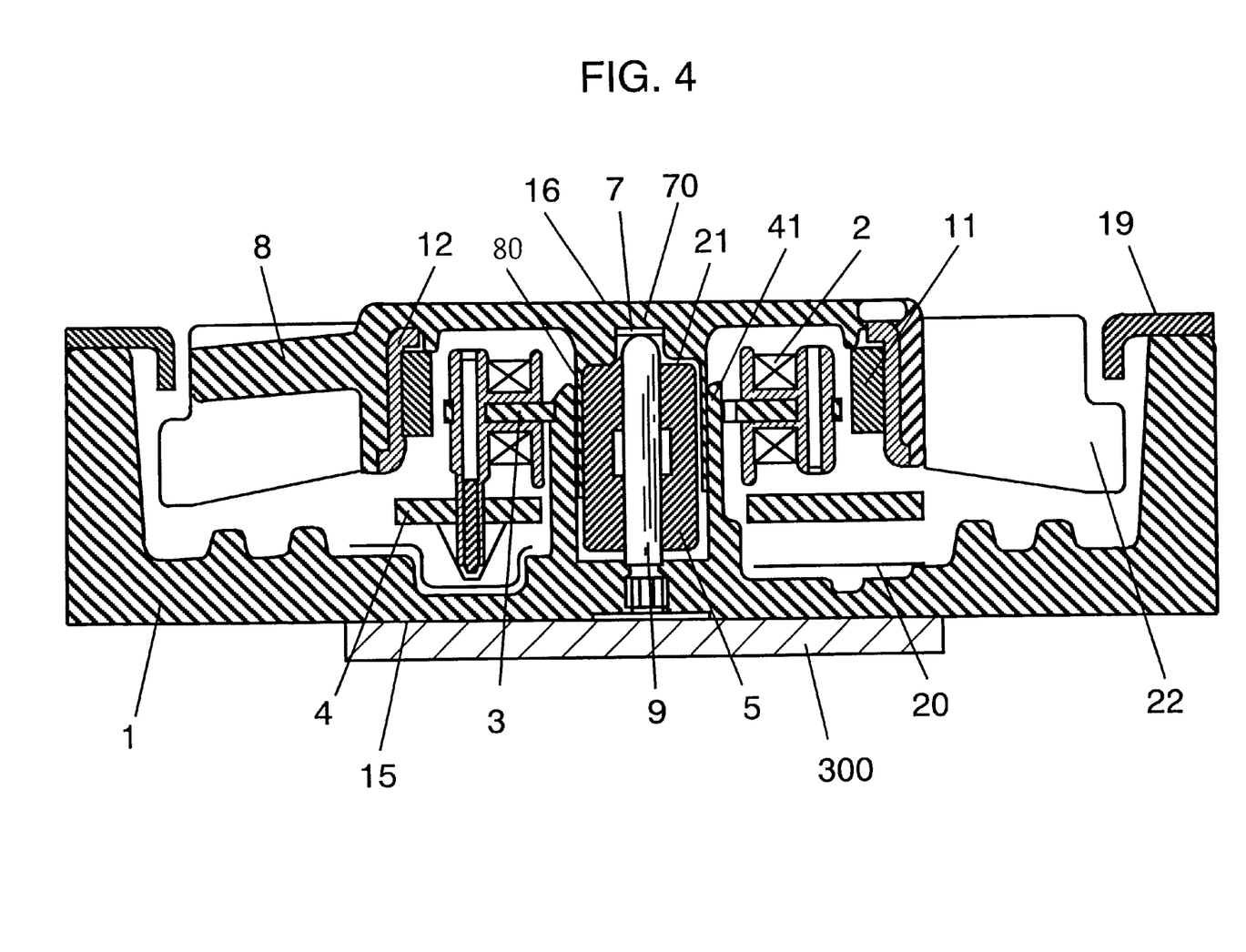
FIG. 4 is a cross section of a cooling device in accordance with a second exemplary embodiment of the present invention.

FIG. 4 is a cross section of a cooling device in accordance with the second exemplary embodiment of the present invention.

A major difference of this embodiment from the first exemplary embodiment is the relation between shaft 9 and sleeve 5. In the first embodiment, shaft 9 spins within sleeve 5; however, in the second embodiment, sleeve 5, press-fitted into rotor-housing 80, spins around shaft 9 fixed to frame-housing 41.

FIG. 4 depicts the construction of cooling device used in the second embodiment. The cooling device comprises the following elements:

(a) frame 1 having a cup-shaped frame-housing 41 protrusively formed on a recess in the frame 1, wherein one side of the frame-housing 41 opens;

(b) frame-housing 41 securing stator 3 wound by coil 2 on its outer wall;

(c) shaft 9 fixed within frame-housing 41, which is a different point from the first embodiment;

(d) driving circuit substrate 4 disposed around frame-housing 41; this and structures (e)–(g) below are the same structures as the first embodiment.

(e) substrate 4 holding stator 3 and connecting a tip of coil 2 electrically to a printed wiring formed on substrate 4 by soldering;

(f) electronic components constituting the driving circuit and Hall elements detecting a rotational position of rotor 16, both mounted on substrate 4; and (g) insulating sheet 20 disposed between substrate 4 and frame 1.

Frame 1 has a side wall and an upward opening. Bell-mouth 19 is disposed around the opening for smooth air flow. Frame 1 is equipped with a given number of openings (marked with numeral 30 in FIG. 1) having a given size on the side wall, and these openings conduct air in a given direction. The bottom face of frame 1 has a flat region underneath which a heating element, e.g. semiconductor device, can be mounted. Frame 1 is made of a metal material of high thermal conductivity, such as aluminum, brass or copper so that thermal conductivity from the heating elements to the frame and fins is increased. As a result, the heat-dissipation-efficiency can be boosted.

Rotor 16 secures fan 8, and step section 22 is formed on the outer edge of fan 8. Bell mouth 19 covers step section 22 to prevent fan 8 from coming off.

Different from the first exemplary embodiment, rotor housing 80, cup-shaped, is protrusively formed on rotor 16. Sleeve 5 is press-fitted into the inner wall of rotor-housing 80. Sleeve 5 is rotatably inserted onto shaft 9 and rotor-housing 80 is inserted into frame-housing 41.

Thrust supporter 70 is unitarily formed with a bottom face of rotor-housing 80. Thrust sheet 7 is disposed on the bottom face. An end of shaft 9 on the opposite side of the bottom face of frame-housing 41 contacts thrust sheet 7. Rotor 16 is thus constructed, and comprises rotor housing 80, sleeve 5, magnet 11, yoke 12 and fan 8. Magnet 11 is placed at a greater distance than stator 3 from the bottom face of frame-housing 41, in the same manner as the first exemplary embodiment. This arrangement allows the rotor 16 to be attracted to stator 3, namely toward the bottom face of frame 1. This attracting force prevents fan 8 from coming off from the bearing.

This second exemplary embodiment produces the same effect as the first exemplary embodiment.

Exemplary Embodiment 3

Figure 5:
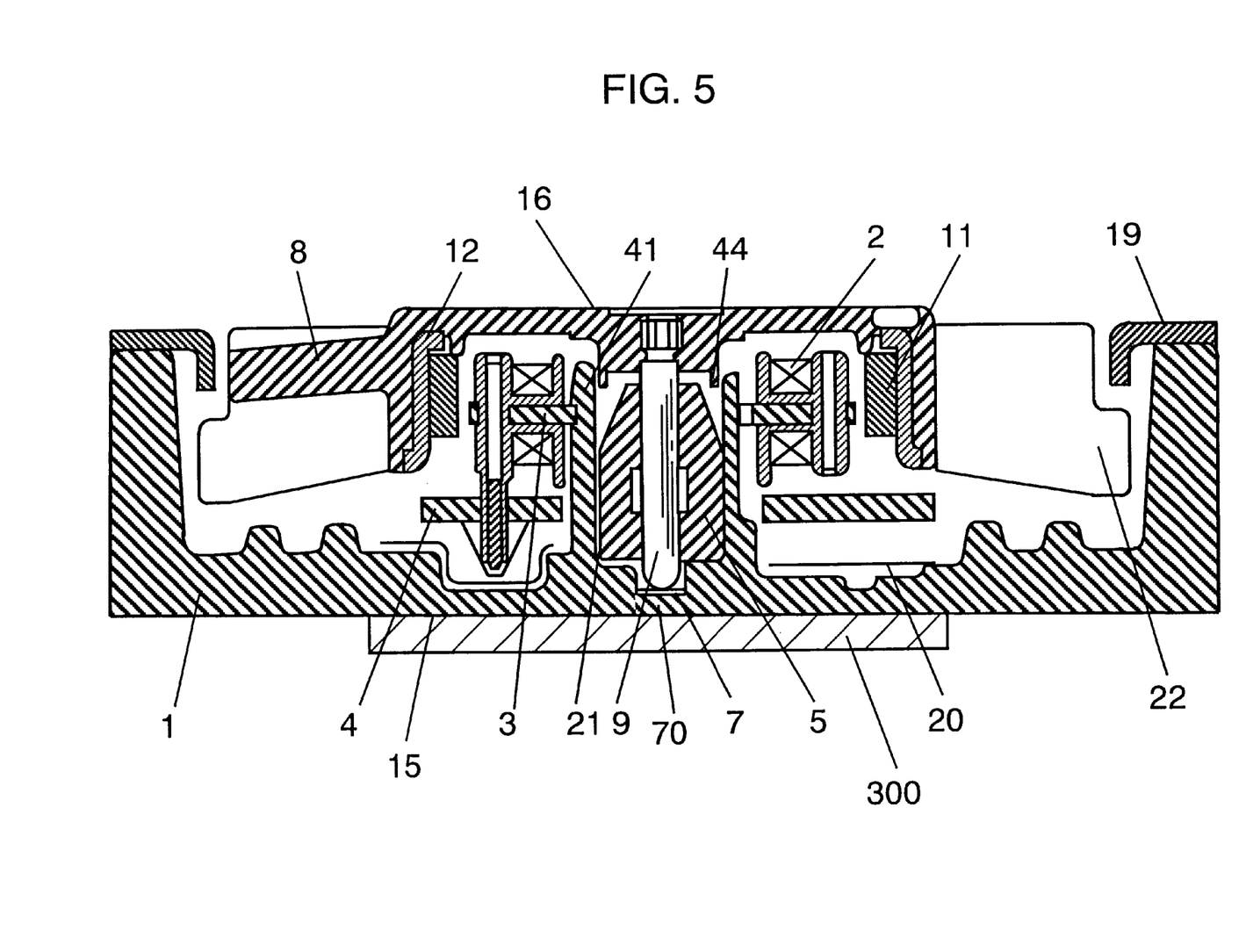
FIG. 5 is a cross section of a cooling device in accordance with a third exemplary embodiment of the present invention.
Figure 6:
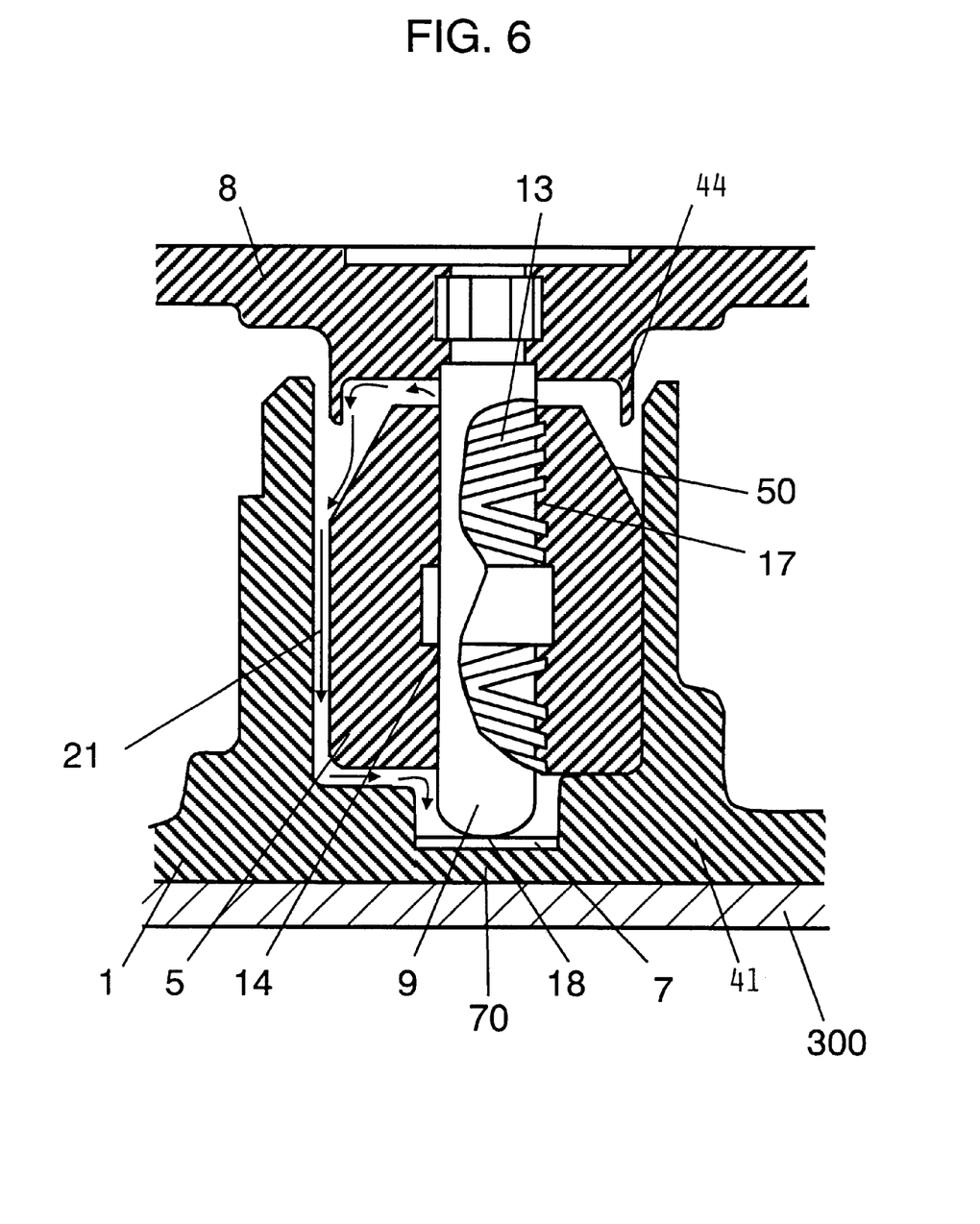
FIG. 6 is a cross section depicting a bearing of a motor employed in the cooling device in accordance with the third exemplary embodiment of the present invention.

FIG. 5 is a cross section of a cooling device in accordance with the third exemplary embodiment of the present invention. FIG. 6 is a cross section depicting a bearing of a motor employed in the cooling device shown in FIG. 5.

Differences of the third exemplary embodiment in FIGS. 5 and 6 from the first exemplary embodiment are as follows. Rotor 16, integrally formed with shaft 9, is provided with a rib 44 around the mounting section of shaft 9. The tip of rib 44 is inserted into the cup of cup-shaped frame-housing 41. The outer diameter of the end of sleeve 5 on rotor 16 side is smaller than the inner diameter of rib 44, and flares out therefrom toward the outer wall of sleeve 5 forming slope 50. This construction allows rib 44 to block the oil splashed out from the space between sleeve 5 and shaft 9 during the operation. The splashed oil is pushed toward rib 44 by centrifugal force and retained on the inner wall of rib 44. The retained oil drops off from rib 44, travels on slope 50, and returns to the space between sleeve 5 and shaft 9 via ventilating groove 21. An oil returning path is thus formed as illustrated in FIG. 6 with arrow marks.

The construction of the third exemplary embodiment can produce not only the effect of the first exemplary embodiment, but also produce another advantage, i.e. if oil were splashed out from the space between sleeve 5 and shaft 9, the oil could be collected smoothly and always retained in the bearing. As a result, a highly reliable and long life motor and cooling device employing the same motor can be realized.

The structures of the cooling device, motor, and bearing, as well as the kind of oil, are not limited to these exemplary embodiments, and various modifications are available.

As discussed above, the present invention realizes a long-life motor in which the narrowed bearing can be processed with ease and its oil-spill due to cycles of temperature changes or motor rotation can be prevented. Further, adherence between heating elements and the cooling device is improved, whereby heat conductivity is increased. As a result, the present invention can increase the cooling performance of the motor as well as the cooling device that employs the motor.

What is claimed is:

1. A motor comprising:

(a) a frame;

(b) a frame-housing provided on said frame;

(c) a stator secured on an outer wall of said frame-housing;

(d) a sleeve fit into said frame-housing;

(e) a thrust supporter unitary with a bottom face of said frame housing;

(f) a shaft supported by said thrust supporter at an end of said shaft, said shaft being inserted into said sleeve and rotatably supported by said sleeve;

(g) a rotor secured to said shaft;

(h) a magnet disposed on said rotor and opposite to said stator; and (i) oil provided in a space between said shaft and said sleeve;

wherein a dynamic-pressure-generating-groove for retaining oil and generating dynamic-pressure by relative rotation between said shaft and said sleeve is formed on one of an outer wall of said shaft and an inner wall of said sleeve, and where said shaft has a mounting section at which said rotor is secured to said shaft, and said motor further comprising:

a groove formed on at least one of the inner wall of said frame-housing and an outer wall of said sleeve, extending from a top to a bottom of said frame-housing; and a rib formed around said mounting section of said shaft on said rotor;

wherein said sleeve has a sleeve-end with an outer diameter adjacent to said rotor smaller than an inner diameter of said rib, and said sleeve-end flares out to the outer wall of said sleeve.

* * * * *